Dec. 29, 1959        C. NEITZERT        2,919,414

MAGNETIC PULSE MODULATOR

Filed Dec. 14, 1954

INVENTOR
C. NEITZERT
BY
ATTORNEY

United States Patent Office 2,919,414
Patented Dec. 29, 1959

2,919,414

MAGNETIC PULSE MODULATOR

Carl Neitzert, Hoboken, N.J., assignor to Bell Telephone Laboratories, Incorporated, New York, N.Y., a corporation of New York Application December 14, 1954, Serial No. 475,029

9 Claims. (Cl. 331—87)

This invention relates to improvements in electrical pulsers and, more particularly, in magnetic magnetron pulse modulators.

As is known, in the advancement of the radar art it has been necessary to provide progressively shorter transmitter keying pulses in order to attain progressive improvements in range resolution. As is also known, so-called cascade or series-type magnetic pulsers tend to give short pulses and have other desirable characteristics and therefore are often preferred over all others for radar keying. Unfortunately, however, development in the ability of these pulsers to produce shorter and shorter pulses some time ago reached a limitation which since then has not been overcome. Since the only alternatives were a return to otherwise less preferred types of pulsers and uncertain and expensive efforts to find new ones, it has for some time been most desirable to overcome this limitation.

Accordingly, it is an object of this invention to shorten the pulses generated by magnetic pulsers and particularly pulsers of the cascade or series type.

It is a further object to shorten the pulses generated by other kinds of pulsers which may have been adversely affected by the same limitations as magnetic pulsers.

It is still another object to improve input circuits for energizing these and other pulsers by direct current.

In general these and other objects have been attained by finding and eliminating the cause of the above mentioned limitation, namely the presence in shunt to the load during its energization of an impedance-matching transformer normally used in the output portion of a pulser where capacitively stored energy is suddenly discharged into the load over the transformer. A new output portion is provided not including the transformer, which nevertheless is retained elsewhere in the pulser to still perform its desired function. As a result the final discharge of capacitively stored energy into the load is over circuitry which has been reduced to a minimum and therefore has minimal amounts of stray series inductance and shunt capacitance.

In the prior art the (step up) impedance-matching pulse transformer mentioned above is continuously in circuit across the magnetron. As a result the resistance of its windings and its leakage inductance are in series with the discharge path to the load and the distributed capacitance of its secondary is added in shunt to that of the load, e.g., the inter-electrode capacitance of a magnetron, during each keying thereof. Since the discharge, particularly when the "switch" is a saturable-core reactor having residual inductance when "closed," is in the nature of a resonance surge at a frequency determined by the LC product of the reactive components of the discharge circuit, the rate of occurrence of this discharge is markedly reduced by the presence of the transformer. Since the keying pulse duration corresponds to a half period at the surge frequency, it follows that these stray reactances impose a limitation on the maximum attainable shortness of the pulses. In addition, the stray capacitance reduces the amount of pulse energy which can be usefully converted into radio frequency power since a substantial amount will be absorbed in charging it before the magnetron fires and will remain in it after the magnetron quenches. Besides being wasted, this energy will thereafter be discharged back into the pulser to produce undesirable transient and surge effects in the interval following the pulse. According to the present invention, instead of the condenser being made to discharge over the transformer into everything on its secondary side as a way of transferring the energy directly into the load in a single step: (1) it is made to discharge solely into part of the capacitance on that side, e.g., into the distributed capacitance of the secondary winding which, as will be seen, actually thus serves a useful purpose as the electrostatic storage element of a resonance-charging "pulse-shortening stage" of the pulser; and (2) shortly after it has thus been stored on the load side of the transformer, the energy is transferred to the load in a separate subsequent switching operation. The next to the last discharge, i.e., the discharge which occurs through the transformer, is kept from the load by adding into the secondary circuit a normally open "switch," such as a saturable-core coil connected in series with the secondary and the load, and the final discharge into the load is effected by an abrupt closure of that switch just about the time when the transfer of charge into the distributed capacitance is completed. Thus structurally the portion of the pulser corresponding to a prior art output portion is divided into two parts, the one nearest to the load constituting a new and simplified output portion with greatly reduced stray reactive components, and functionally the part of its operation which formerly comprised the keying discharge is now divided into two successive discharges. Since each of these discharges will comprise a resonance current surge at a frequency determined by a reduced LC product, it will be completed much more quickly than was possible for the single final discharges of prior art pulsers, e.g., in .05 microsecond as has been achieved in actual practice. Moreover since the added switch does not necessarily have to be magnetic nor the load capacitive, it is possible for the output portion to offer a substantially purely resistive impedance to the final discharge and therefore it should be possible to produce even shorter pulses.

According to another feature of this invention the arrangement of a switching tube in an input portion of a direct current energized, series-type, magnetic pulser has been modified to afford improved operation and economy of parts.

In the drawing, all figures of which are schematic circuit diagrams:

Figure 1:
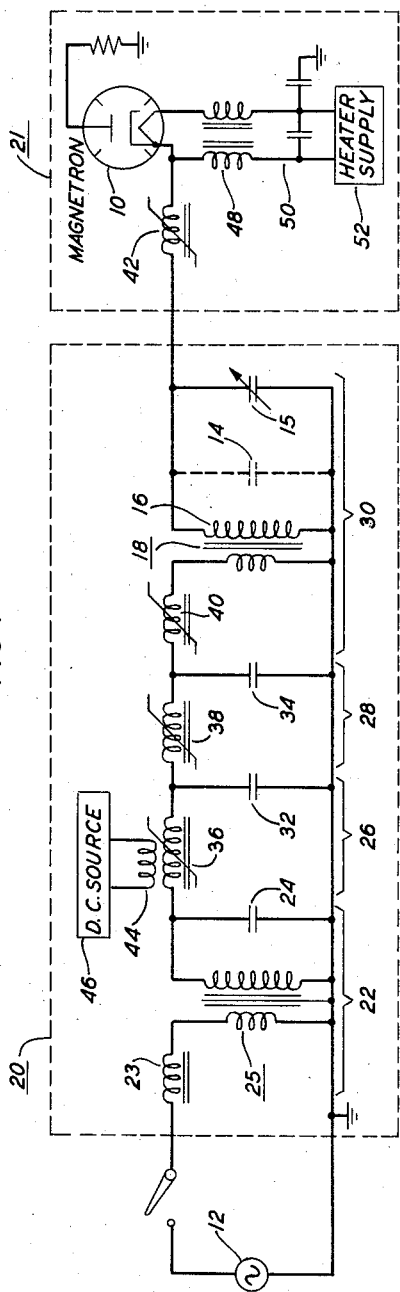
Fig. 1 represents an embodiment of this invention which is energized from an alternating current source.

The pulse generator shown in Fig. 1 operates on the known principle of storing energy electrostatically in the relatively long intervals between pulses and then abruptly discharging it into a load, the load in the case of the present keyer being a magnetron 10. This kind of operation has the usual advantage of permitting the use of a prime energy source (12 of Fig. 1 or 12' of Fig. 2) which has a relatively low peak power rating since the time available in each cycle for the storage of energy is much greater than that during which energy is drawn from the pulser. Moreover it enables the generation of very short pulses since electrostatically stored energy can usually be drawn upon as quickly as the value of the load impedance will permit, and even very quickly for high resistance loads if the energy storage is at a high enough voltage level.

According to a principal feature of this invention, the final storage herein is in the distributed capacitance 14 of the secondary 16 of a stepup pulse transformer 18 supplemented, if necessary, by a padder condenser 15. Except in this particular feature of its use and in the circuit modifications by which it is achieved, the transformer is employed herein for the usual purpose of permitting a large part of the pulser to operate in a lower voltage range than that needed for energizing the magnetron so that a minimum of bulky and costly condenser and other insulation is required. The pulser comprises an input portion 20 for cyclically charging the capacitance 14 from an alternating current source 12 and an output portion 21 for discharging it into the load.

As will be seen, in each cycle of the pulser's operation the portion 20 receives from the source 12 one low level (but relatively long duration) voltage loop having the desired energy content of one output pulse, and utilizes all of the energy (except for losses) to charge up the capacitance 14 to a high enough voltage to fire the magnetron, say to a voltage 550 times as high as the low level voltage loop, completing each such charge just in advance of the intended time of occurrence of each keying discharge of this capacitance. This type of operation has the advantage of not requiring either a prime source of energy or any large storage thereof at the high voltage level of the keying pulses. In addition, as will be more fully described below, the portion 20 is made to operate unsymmetrically so that it thus periodically charges up this capacitance in the correct direction for energizing the magnetron, but does not at any time equally charge it up in the opposite direction.

The input portion 20 comprises an input section 22 having the principal function of effecting a first increase in the peak voltage excursions of the alternating current energy which is supplied to the pulser from the low voltage source 12. To this end it comprises a choke coil 23 and a condenser 24 which have suitable values of inductance and capacitance to be series resonant at the alternating frequency of the input energy as coupled together across the source by a stepup transformer 25 with the condenser on its high impedance side. As will be known to those skilled in the art, the voltage increasing effect of this entire arrangement is equal to the product of the following two separate voltage increasing effects: (1) that of a circuit comprising the choke coil 23 and a condenser which corresponds to the condenser 24 but is connected in series with it directly instead of through the transformer, and has a suitably larger value of capacitance to resonate at the same frequency without the impedance changing effect of the transformer, namely that of producing across the condenser approximately $$\frac{\pi}{2}$$

times the peak amplitude of the source voltage at the end of the first received half cycle of the prime source's alternating output and approximately $\pi$ times the peak amplitude at the end of the first cycle (this being possible, as is known, as an "alternating current resonant-charging" effect); and (2) that of the transformer of multiplying the source voltage by a factor equal to its secondary-to-primary turns ratio. Thus if the peak excursions of the alternating current input are of the order of 100 volts and the transformer has a turns ratio of eighty to one, a peak voltage of about 24,000 will be developed across the condenser 24 during its first cycle of resonance from a starting condition in which it contains zero charge. Thus the input section 22 will be able to provide a succession of 24,000 volt loops to the circuit which follows it providing that circuit is effective fully to discharge the condenser once per cycle.

The circuit following the section 22 comprises a cascade or "series" of three resonance-charging pulse-shortening stages 26, 28, 30 including respective elements which can electrostatically store energy therein, i.e., condensers 32 and 34 which afford lumped storage capacitance for the stages 26 and 28, respectively, and the secondary 16 which affords its distributed storage capacitance 14 for the stage 30. The capacitances of the condensers 24, 32, and 34 are all equal to the effective value of the distributed capacitance 14 (as supplemented by the padder condenser 15, if one is used) as seen across the primary of the transformer, this being very much larger than its value as seen directly across the secondary.

The pulser is so arranged that during each interval between output pulses the condensers 24, 32, and 34 and the capacitance 14 are charged in rapid step-by-step succession with a quantity of energy which first enters the condenser 24, as mentioned above, as a unidirectional resonance-charging surge and finally passes from the capacitance 14 to the magnetron 10 as a keying pulse. During a terminal portion of each free resonance-charging period of the condenser 24 (the entire period corresponding to one full cycle of the alternating current input) there is developed across this condenser the leading edge of a negative-going voltage pulse with the same generally sinusoidal shape and relatively long duration as a quarter cycle of the alternating current input from source 12. As will be seen, the trailing edge produced by the discharge of this condenser will be much steeper.

As the energy moves forward from the storage element of one stage to that of the next, there are produced across the successive stages voltage waves which have more and more the character of the desired keying pulse by being progressively shorter and shorter in their durations and having progressively steeper and steeper leading and trailing edges. The successive forward surges of charging current into the condensers 32 and 34 and then into the capacitance 14 are effected over successive magnetic switches or "pulsactors" 36, 38, 40 which control their respective times and rates of occurrence. As is known (see Proceedings of Institution of Electrical Engineers, May 1951, part III, No. 53, page 185) a "pulsactor" is a nonlinear inductor whose core is adapted to saturate very abruptly and thereby to cause the self-inductance of its winding to equally abruptly drop to an extremely low "air core" value. Thus, whereas each pulsactor normally acts to isolate the storage capacitances positioned on its opposite sides and therefore to greatly limit any current flow between them while the condenser on its input side is charging, once it saturates it undergoes a pronounced change in which, suddenly acting like a closed switch which has only a very small, though a finite, value of series inductance, it interconnects them permitting a current surge of large magnitude to pass between them and causing the surge to be a resonant one due to coaction between its residual ("air core") inductance and the two adjacent capacitances.

The pulsactor 36 is designed with enough unsaturated inductance so that when subjected to the voltages developed across the condenser 24 during each cycle of free resonance of the circuit 23, 24, 25 no current which is forced through its winding by these voltages will attain a sufficient magnitude to saturate its core until about the time when the negative-going charging excursion alluded to above reaches its peak value. In other words it will only be saturated by current flow in the keying pulse forming direction and it will not be saturated by that until about the end of each cycle of free resonance. To this end the value of its unsaturated inductance is made to be of a larger order of magnitude than that of the self-inductance of the choke 23 and in fact than even the value thereof as viewed from the primary side of the transformer 25. However, once it saturates, it will have a value of saturated inductance which is but a very small fraction of its unsaturated inductance, say $\frac{1}{2000}$, the magnitude of this change in inductance being related in a known manner to the magnitude of the change in the permeability of its core which takes place when it saturates. Thus the resonance frequency at which the condenser 24 discharges into the condenser 32 will be very much higher than that at which the condenser 24 was charged, and the negative-going voltage pulse thus developed across the condenser 24 will have a much steeper trailing edge than leading edge.

Since, therefore, the condenser 32 will charge up very much more quickly than the condenser 24 (and, as should be noted, to no higher a voltage) the pulsactor 38 need have only a proportionately very much smaller value of unsaturated inductance than the pulsactor 36, in order to maintain the required isolation between the condensers 32 and 34 while the former is charging, and, as a result it will also have a similarly smaller value of saturated inductance. For like reasons the unsaturated and saturated inductance values of each successive pulsactor in this cascade, or in any similar one, can be smaller than those of the pulsactor preceding it in substantially the same proportion up until a stage is reached in which the smallness of its pulsactor's saturated inductance value approaches the total value of the lead and other stray inductances of that stage.

After each pulsactor has become saturated by current in the pulse-forming direction "resetting" thereof is initiated by current forced through it in the opposite direction by the potential which will then be present across the condenser on its output side. As is known, resetting of all of the pulsactors will then be completed by a continued flow of current in that direction which will take place during the positive-going charging of the condenser which takes place in an initial portion of each cycle of the alternating current input energy.

If, as in the prior art, the charge stored in the condenser 34 were now to be discharged over the pulsactor 40 into all of the remaining portion of the pulser at once (as a result of the customary direct connection of the magnetron 10 across the secondary 16), the voltage pulse thereby developed across the load would be a deteriorated version of that developed in that last stage 28 of the cascade due to the large reactive components of the output portion, and in addition, as noted above, part of its energy would eventually be wasted due in particular to the excessive capacitance on the secondary side of the transformer. In this kind of operation the large reactive components result in a relatively low resonance frequency for all of the final portion of the pulser extending between and including the condenser 34 and the load 10, and thereby in relatively slow current surges between these two elements, regardless of how rapidly the former itself may have been charged previously. Or, to describe the effect in another way, the excessive series inductance and shunt capacitance filter out the high frequency components of the pulses which were previously formed in the stage 28 and which were then sought to be transferred from the cascade into the load via the transformer in a single discharge.

To avoid these effects, as indicated above, another switch, pulsactor 42, is added in series with the secondary 16 and the load 10. Its normally open condition permits the condenser 34 to fully discharge solely into the capacitance 14 (and the condenser 15 if one is used) during saturation of the pulsactor 40 so that a final pulse-forming discharge can be accomplished entirely subsequently and as a separate step involving only circuitry on the secondary side of the transformer 18 and therefore minimum amounts of inductance and capacitance.

After passing to the secondary side of the transformer, the energy comprised in each pulse will have been raised to a higher voltage level of the order of say 55,000 volts and therefore will be capable of being stored electrostatically in a much smaller capacitance than was required in each of the stages 24 and 26, specifically in a capacitance which is smaller by the square of the secondary-to-primary turns ratio of the transformer 18. Because of this it will be easy to attain a smaller LC product and thereby a higher resonance frequency for the surge involved in the final discharge than that of any other resonance surge attained in the pulser even if the total series inductance, i.e., the lead inductances plus the residual pulsactor inductance, involved in the final discharge is not smaller than that involved in any preceding discharge.

It is noted that in the present arrangement bulky and expensive high voltage condensers not only are unnecessary in the portion of the pulser preceding the transformer 18 but also in the portion which follows it in that the normally undesirable distributed capacitance of the secondary 16 is made to serve as a high voltage electrostatic storage element. Thus double use is made of the insulation which the transformer must have anyway to perform its principal function.

The pulsactor 36 has an auxiliary bias winding 44 which is energized from a source 46 with direct current of the proper polarity to oppose core magnetization caused by current flow in the main winding in the direction of the surges which produce the keying pulses. Since this increases the time required for saturation to be caused by such current flow and reduces that required for it to be caused by opposite flow, in effect it causes the pulsactor 36 to offer more nonsaturated inductance to one than to the other with the result that the stage 22 only performs its above described pulse-shortening function for input voltage loops of a single polarity. By thus causing this stage to convert its symmetrical input into a nonsymmetrical output the biasing enables the pulser to produce keying pulses of only the one polarity required to fire the magnetron.

A bifilar choke 48 is employed in a manner which is well known to those skilled in the art to prevent the final keying pulses from being grounded through the magnetron cathode heater circuit 50 and the heater supply 52.

As is known, it is possible to energize a series-type magnetic pulser with direct current by using a switch to effectively convert the current flow into a sequence of surges having such parameters that the pulse-shortening stage(s) can convert them into the desired keying pulses as described above. Since the present pulsers are included among those which can be thus direct current energized, one of the objects of this invention has been to improve circuits employed for this purpose, an object the attainment of which is embodied in the circuit shown in Fig. 2.

This circuit includes a condenser 24' which serves much the same purpose as the condenser 24 of Fig. 1, namely that of periodically receiving for momentary storage, and thereafter releasing to the stage 26, a quantity of energy suitable for feeding the pulse-shortening stage(s) for one cycle. However in this case the energy which the condenser 24' receives is provided by a direct current source (12'). Since the output of this source is inherently continuous, rather than periodic like that of the alternating current source 12 described above, the continuity of the current flow through the input circuit fed by it must be artificially switched to provide that the energy transfer to the condenser 24' be as a sequence of successive, discrete, equal quantities each corresponding to the desired energy content of the keying pulse and that an input cadence be established which will determine the pulse repetition rate, and to make it possible for cyclical reversals of current to occur in the shortening stages so that the surges which occur in the pulse-forming direction therein may alternate with flow in the opposite direction for resetting the pulsactor cores. To this end this circuit, like those of the prior art, uses a gas filled switch tube (54) and a source of accurately timed pulses (56) for periodically firing it. However, for reasons explained below, in contrast to the prior art practice it is not serially connected into the high side of the pulser along with the one or more pulsactors employed for pulse shortening.

Figure 2:
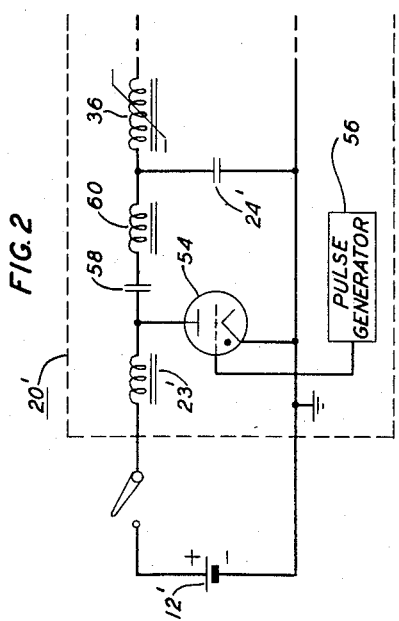
Fig. 2 represents a novel input portion for energizing a series-type magnetic pulser, such as the pulser of Fig. 1, from a direct current source.

Instead, as shown in Fig. 2, it is connected in shunt between the output end of a choke 23' (which corresponds to the inductor 23 of Fig. 1) and the grounded side of the pulser while a condenser 58 and another choke 60 are serially connected between the first choke 23' and the first pulsactor 36. The generator 56 is adjusted to fire the tube 54 at a predetermined time in each cycle when, as will be explained below, the pulsactors of all of the pulse-shortening stages will have been saturated as to current flow to the right (in the drawing) and the condenser 58 will have just been fully charged by such a flow of current from the source 12', over the choke 23' in the direction of the load, and back to the source over return paths including all the pulsactors and other components of the cascade of pulse-shortening stages. This closing of the gas tube switch will cause a resonance discharge of the condenser 58 into the condenser 24' by a counterclockwise current surge around the loop comprising the condenser 58, the tube 54, the condenser 24', and the second choke 60. Before the end of this surge the positive pulse applied to the grid of the tube by the generator 56 will have terminated leaving the grid free to return to its quiescent cutoff-biased condition as soon as the tube quenches due to the continuing drop in its anode potential as the condenser 58 discharges, the latter being possible because the high inductance of the choke 23' will meanwhile limit to a relatively very small magnitude the continuing rightward flow of current from the source 12'. While the charge is building up across the condenser 24' it will cause a gradually increasing current to flow through the pulsactor 36 to the left (in the drawing) and when the charge is near its maximum this will cause this pulsactor to saturate as to current flow in this leftward pulse-forming direction thereby discharging the condenser 24' and starting a rapid succession of pulse-shortening discharges as above described with reference to Fig. 1; the condenser 58, which will have slowly started to recharge during the pulse-forming discharges, will continue to do so in the remaining part of the interpulse interval until it is fully charged; and, since the direction taken by the respective part of its charging current which passes through each pulsactor in the return path network to the source 12' will be opposite to that of the preceding pulse-forming surge therein, its core will be saturated as to rightward current flow and thus automatically reset and readied for the next cycle. Obviously this could not happen if, as in the prior art, the tube were in series with the pulsactors since the tube cannot carry current in both directions. Because of this, in all prior art direct current energized pulsers of this kind the pulsactors must include biasing windings (like the winding 44 of Fig. 1) even though they are not needed for causing the output keying pulses to be of only one polarity. On the other hand such auxiliary windings are unnecessary in the present pulsers and, in addition, another important simplification is afforded by the fact that the cathode of the switch tube is always at ground potential, i.e., that no high voltage insulation is required for the cathode heater circuit.

Figure 3:
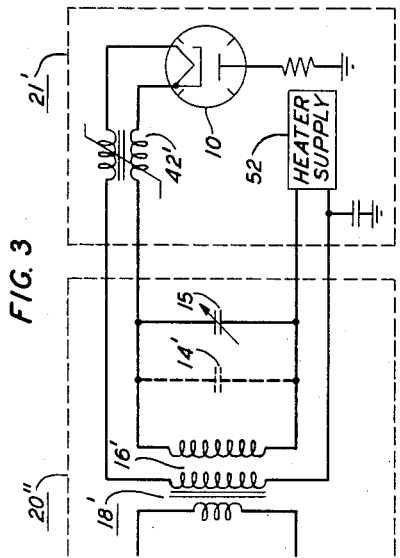
Fig. 3 represents a modification of the Fig. 1 embodiment whereby energy for heating the magnetron cathode is somewhat differently applied thereto.

Fig. 3 shows a modification whereby the bifilar choke 48 of Fig. 1 may be eliminated. To this end a modified impedance-matching transformer 18' having a bifilar secondary 16' and a modified final pulsactor 42' having a bifilar winding are employed, the heater supply 52 being connected to the low end of the secondary and the heater extending through the secondary 16' and the pulsactor 42' as shown.

The present keyer has an added advantage resulting from the fact that in the design of the output portion less of a compromise is required by the dual nature of the load during keying, i.e., its primarily capacitive impedance before the magnetron fires and after it quenches and its primarily resistive impedance during firing, since with the present large reduction in load shunt capacitance the magnitude of this impedance change has been correspondingly reduced. Because of this it has been possible for pulsers of the present type to be designed with a markedly reduced tendency of the keying voltage pulse to overshoot the firing potential of the magnetron and to thereby cause multi-moding.

What is claimed is:

1. Apparatus comprising a transformer having a primary and a secondary, a magnetron on the secondary side of the transformer and normally electrically isolated therefrom by a high impedance, a predetermined amount of capacitance across said secondary said capacitance comprising the distributed capacitance of said transformer and that of a padder condenser connected across said secondary, means for feeding very low duty cycle pulses into the primary of the transformer periodically to charge said capacitance to a predetermined high voltage, and means operative in synchronous and slightly delayed time relationship to the periodic chargings of said capacitance for greatly reducing said impedance to thereby discharge said capacitance into said magnetron.

2. A pulser as in claim 1 in which said means for feeding very low duty cycle pulses into the primary of the transformer comprises a direct current source; first and second storage condensers, means for charging the first condenser from the source at at relatively slow rate and with at least a predetermined amount of energy, means including a gas filled switching tube for periodically resonance-discharging the first condenser into the second to establish the periodicity of said transfers of energy, and means for subsequently feeding substantially all of the energy thus transferred between the two condensers into the primary of said transformer as a resonance current surge of much shorter duration than the charging time of the first condenser.

3. A pulser as in claim 2 in which said means for charging the first condenser includes an impedance for controlling the relatively slow rate at which this condenser is charged; said means for resonance-discharging the first condenser includes an inductor for coacting with said first and second condensers to determine the rate of the resonance discharge between them; said impedance, said first condenser, said inductor, and said first and second mentioned pulsactors are serially connected together in the order named between one side of said source and one of said input terminals of the transformer, a conductor extends between the other side of the source and the other of said input terminals; said tube is connected between said conductor and the junction of said impedance to said first condenser; and said second and third condensers are connected between the respective ends of the first mentioned pulsactor and said conductor.

4. A pulser comprising a direct current source of electrical energy, a load having direct current continuity between its input terminals including a stepup transformer on its input side and a magnetron on its output side, a circuit extending from one side of said source to one side of said load and including in series in the order named a current limiting impedance, a first storage condenser, an inductor, and a pulsactor, a return circuit interconnecting the respective other sides of said source and said impedance, a periodically operable switching device connected between said return circuit and the junction of said impedance to said first condenser, and a second storage condenser connected between said return circuit and the junction of said inductor to said pulsactor.

5. A pulser comprising a direct current source of electrical energy, a load, and means for periodically transferring a discrete predetermined amount of energy from said source into said load, said means including first and second storage condensers, means for charging the first condenser from the source at a relatively slow rate with at least said predetermined amount of energy, means including a gas filled tube for periodically resonance-discharging the first condenser into the second to establish the periodicity of said transfers of energy, and means including a pulsactor connected between one side of the second condenser and one side of the load for subsequently discharging the former into the latter.

6. A pulser as in claim 5 in which said last mentioned means includes at least two pulsactors connected serially between said one side of the second condenser and said one side of the load, a return circuit interconnecting the other side of the load to one side of said source, and an additional condenser connected between said return circuit and each junction between two adjacent serially connected pulsactors.

7. A pulser as in claim 5 in which said first condenser and said pulsactor are included serially in a circuit connecting one side of said source to one side of the load, a return circuit interconnects the respective other sides of the source and the load and is maintained at "ground" potential in the operation of the pulser, said switching device is a discharge device including a cathode, and said cathode is connected to said return circuit.

8. A magnetic pulser comprising a source of periodic high duty cycle voltage loops, means comprising a storage condenser and a pulsactor for converting each voltage loop into a relatively much shorter voltage pulse across the condenser by applying the loop thereto to resonance charge it over the pulsactor, a second pulsactor, an impedance matching stepup transformer having a bifilar secondary, the primary of the transformer being connected to the condenser over the second pulsactor, a bifilar pulsactor, a magnetron having a thermionic cathode, and a source of heater current, one side of the bifilar secondary being connected to said cathode over the bifilar pulsactor to carry heater current thereto and its other side being connected to the output terminals of said source of current.

9. A series-type magnetic pulser comprising a source of periodic high duty cycle voltage loops, a cascade of pulse shortening stages each including a series pulsactor followed by a shunt condenser for converting each voltage loop, by a succession of resonance energy transfers from stage to stage at successively higher rates, into a very much shorter voltage pulse across the condenser of the last stage in the cascade, an additional pulsactor, an impedance-matching stepup transformer having a bifilar secondary, the primary of the transformer being connected to said condenser of the last stage over said additional pulsactor, a bifilar pulsactor, a magnetron having a thermionic cathode, and a source of heater current, one side of the bifilar secondary being connected to said cathode over the bifilar pulsactor to carry heater current thereto and its other side being connected to the output terminals of said source of current.

References Cited in the file of this patent
UNITED STATES PATENTS

| | | |
|---|---|---|
| 2,419,201 | Crump et al. | Aug. 22, 1947 |
| 2,579,542 | Bostick | Dec. 25, 1951 |
| 2,650,350 | Heath | Aug. 25, 1953 |
| 2,710,351 | Lebacoz | June 7, 1955 |
| 2,727,159 | Sunderlin | Dec. 13, 1955 |